US005146385A

United States Patent [19]

Misencik

[11] Patent Number: 5,146,385

[45] Date of Patent: Sep. 8, 1992

[54] SHALLOW ELECTRICAL RECEPTACLE WITH SURGE SUPPRESSOR AND ISOLATED GROUND

[75] Inventor: John J. Misencik, Shelton, Conn.

[73] Assignee: Hubbell Incorporated, Orange, Conn.

[21] Appl. No.: 465,857

[22] Filed: Jan. 16, 1990

[51] Int. Cl.$^5$ ........................ H02B 1/26; H01R 13/60; H02H 1/04

[52] U.S. Cl. ........................................ 361/56; 361/117; 361/91; 361/111; 361/126; 361/356; 439/539; 439/621; 439/490

[58] Field of Search ................... 361/117, 56, 91, 111, 361/126, 127, 356; 439/538, 539, 620, 621, 490

[56] References Cited

U.S. PATENT DOCUMENTS

| | | | |
|---|---|---|---|
| 4,010,431 | 3/1977 | Virani et al. . | |
| 4,217,619 | 8/1980 | Tibolla . | |
| 4,398,236 | 8/1983 | Campisi et al. . | |
| 4,468,718 | 8/1984 | Main .................................. | 361/399 |
| 4,641,370 | 2/1987 | Oyamada . | |
| 4,688,135 | 8/1987 | Leopold . | |
| 4,855,719 | 8/1989 | Posey . | |
| 4,872,081 | 10/1989 | Murphy et al. . | |
| 4,876,713 | 10/1989 | Crosby et al. . | |
| 5,032,954 | 7/1991 | Juza .................................... | 361/415 |

*Primary Examiner*—Steven L. Stephan
*Assistant Examiner*—Ben Davidson
*Attorney, Agent, or Firm*—Jerry M. Presson; Alfred N. Goodman

[57] ABSTRACT

A duplex receptacle has a housing base with insulating wall elements to which an insulating circuit board supporting a surge supressor circuit is fit. The surge suppressor can be preassembled and located as a compact unit in the housing with connective connections to each of the power conductors and ground. The device also has an insulated ground feature with each ground contact extending into housing base projections which have openings accommodating an insolated ground strap to which the internal ground contacts are joined. The features of the invention are well suited for shallow receptacles as may be fit within outlet boxes of a depth of no more than about 1½ inches.

16 Claims, 3 Drawing Sheets

FIG. 4.
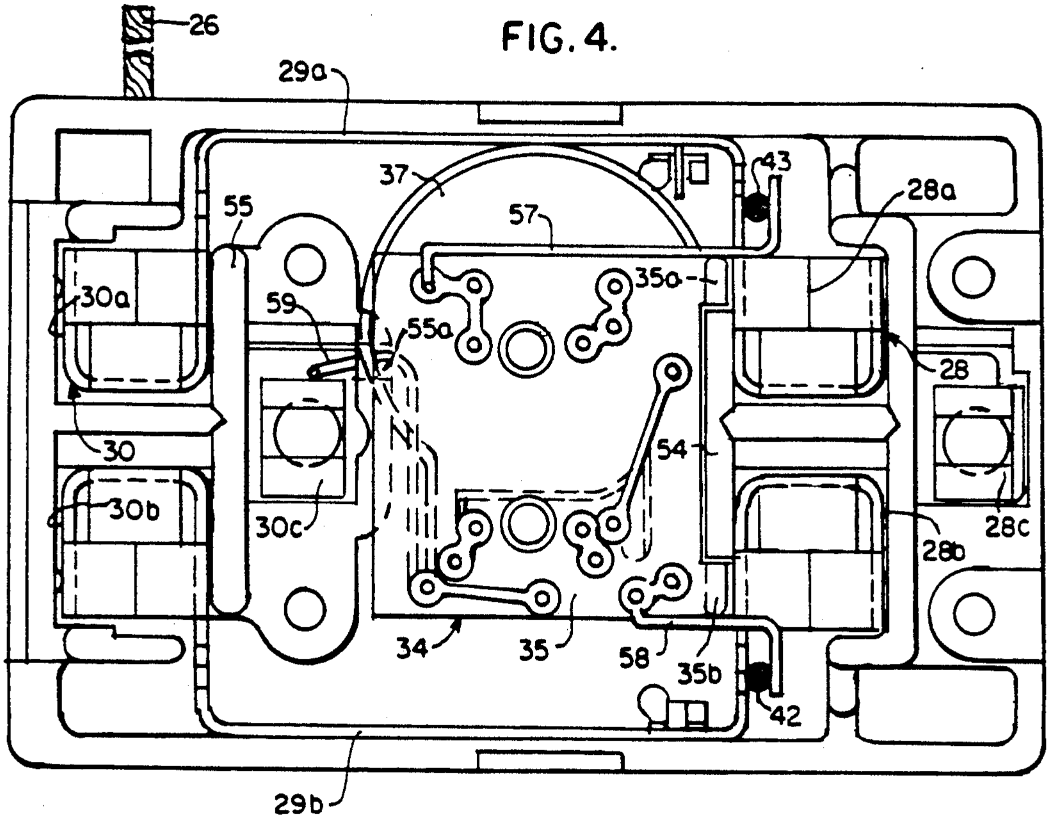
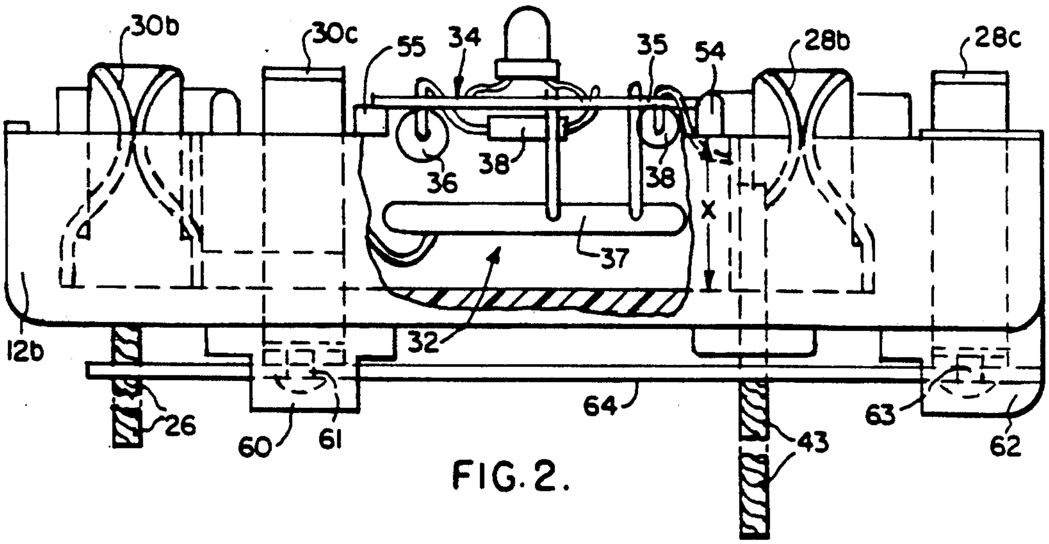
FIG. 2.

FIG. 3.
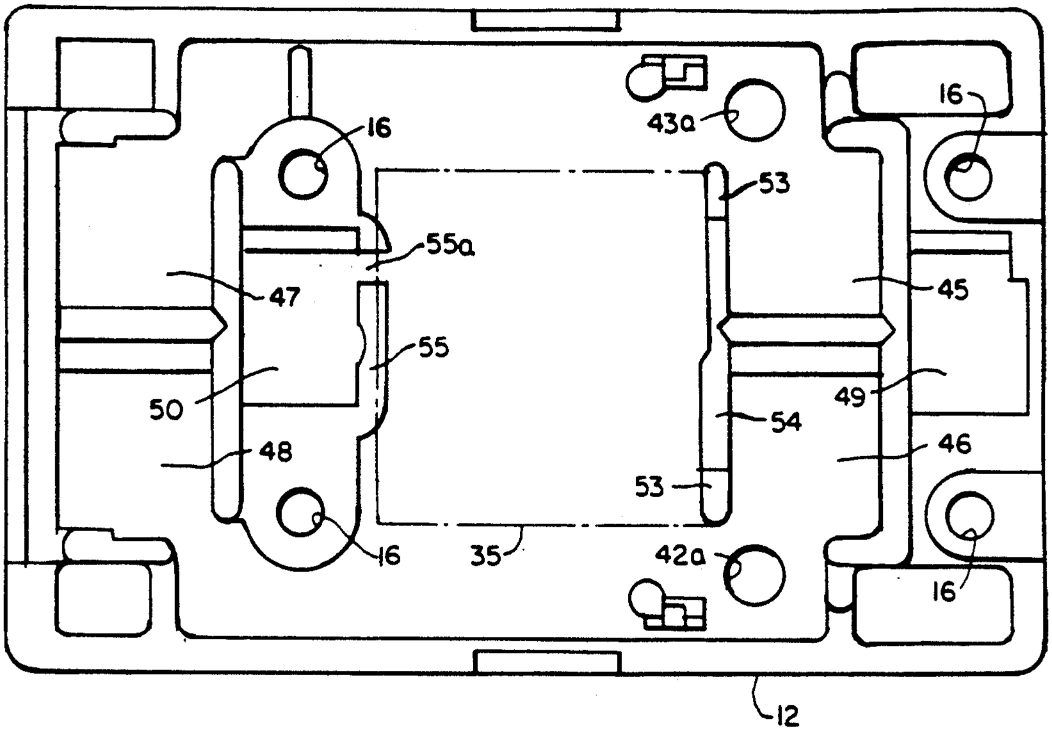
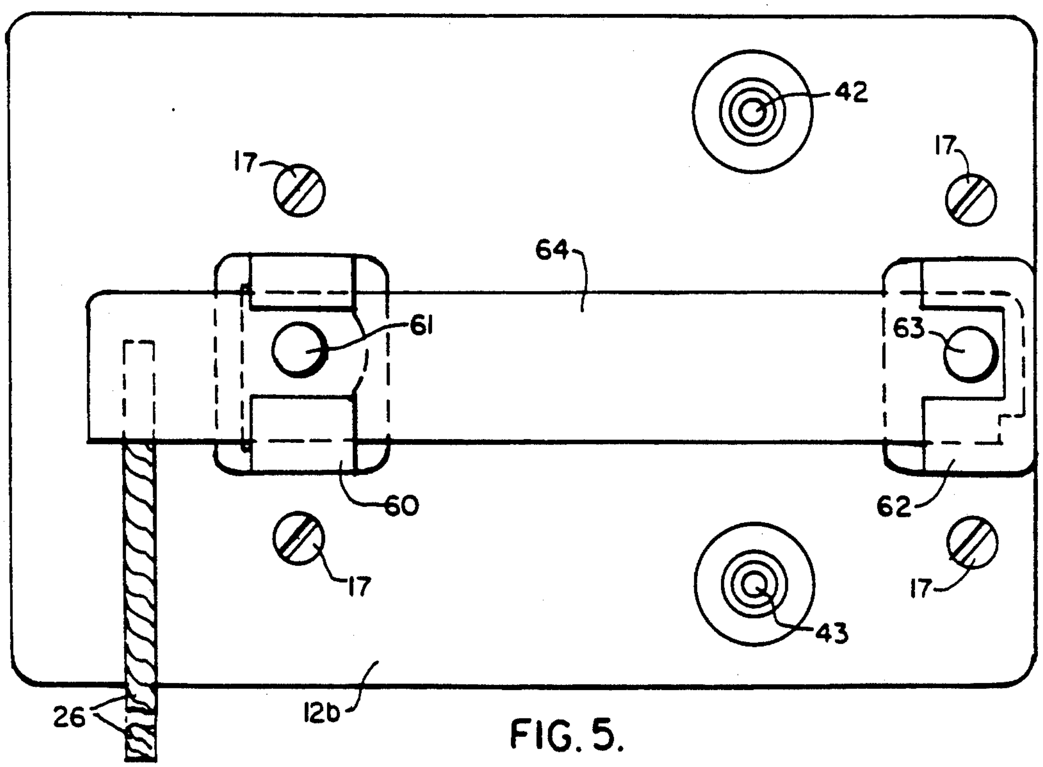
FIG. 5.

SHALLOW ELECTRICAL RECEPTACLE WITH SURGE SUPPRESSOR AND ISOLATED GROUND

BACKGROUND AND SUMMARY OF THE INVENTION

This invention relates to electrical receptacles and particularly to receptacles with a shallow housing also provided with surge suppressor and isolated ground features.

Most duplex electrical receptacles used for residential and commercial applications have a housing, including an insulating base and cover, with a depth dimension for the base of about 1 inch or more to house the contacts and any other internal components. Some receptacles for such applications have a more shallow depth dimension. One such receptacle is the Bryant T-82 receptacle with a maximum base depth of only about 0.7 inch and only about 0.5 inch over most of the base. These receptacles are easily installed in construction boxes having a total depth of only about 1.5 inches. While the basic features for a satisfactory duplex receptacle have thus been provided in a shallow enclosure, the shallowness of the enclosure minimizes the internal volume available for additional features or functional components.

There has recently been a growing interest in providing receptacles with surge suppression. In copending application Ser. No. 345,929, filed May 1, 1989, there is disclosed an electrical surge suppressor and dual indicator apparatus for incorporation within receptacles. The surge suppressor of the copending application is one example of surge suppressor apparatus that may be utilized in accordance with the present invention within shallow receptacles.

One object of the present invention is to provide receptacle configurations, with surge suppressors, that are suitable even for compact, shallow receptacles.

Grounding is an important feature of most receptacles. Receptacles as commonly used have an insulating housing with a metal mounting yoke. For duplex receptacles in which each part has three contacts for the pair of line conductors and the ground conductor, it is commonly the case that the ground contacts within the receptacle are conductively related to the metal mounting yoke. A grounding path may exist through the metal mounting yoke to the wall box in which the receptacle is mounted, as well as through a ground conductor connected to the ground contacts. As is well known, it is sometimes preferred that the internal grounding contacts are conductively connected only with a grounding path apart from the metal yoke and wall box. Such an isolated ground has been achieved by providing an insulating barrier between the ground contacts and the yoke. Shallow receptacles, such as the abovementioned Bryant type SP52L, present a need for isolated ground features that is uniquely satisfied in accordance with a further aspect of the present invention.

The foregoing aspects of the invention, relating to (1) mounting a surge suppressor and (2) the provision of an isolated ground, may of course be used independently of each other as well as in combination. They are described together in the specific embodiment of applicant's invention hereinafter.

Briefly, the invention succeeds in mounting surge suppressor circuits in receptacles, even if they are shallow, by use of an insulating circuit board on which components of the circuit are mounted with board portions that fit in close relation to insulating walls of the receptacle base so it is secure in use while also being easily assembled in the receptacle.

In an embodiment of the invention, the circuit board is centrally located between the two contact areas of the duplex receptacle and on its top surface facing the front cover of the device are mounted the indicator element or elements of the surge suppressor which are viewable from the front of the device when the cover is on. The other components of the suppressor circuit are located on the back side of the circuit board within a pocket of the base. The circuit board is mounted on respective notched wall portions in which elements such as first and second lateral ears of the circuit board fit to avoid movement of the board. Further, there is provided support under the board by part of the insulating wall portion and the cover may assist in clamping the board in place.

The circuit board may be configured to have most of its working elements closely bonded to the circuit board itself while one or more metal oxide varistors, which provide the key surge suppression functions in the circuit, are physically located spaced from the circuit board, attached thereto by conductors to complete the circuit, in the volume located below the circuit board and its more closely mounted components.

To provide the isolated ground of a receptacle, which may be shallow in its housing configuration, the two sets of contacts each include a pair of power contacts and a ground contact in which the ground contact has a length that extends into a bottom projection of the base. Ground contacts are normally longer in extent than power contacts because the mating plug has a longer ground prong. In shallow receptacles, it may not be possible to configure the housing to provide the ground contact within the depth that accommodates the power contacts. Thus, the base of a device such as the Bryant SP52L is provided with two bottom projections that each provide a cavity for each ground contact. According to this invention, each such bottom projection has an opening allowing external access to the ground contact contained therein and a ground conductor is connected to each such ground contact. Each ground contact is free of any connection to the mounting yoke.

In one embodiment, the ground conductor is a metal bar or strap to which each of the ground contacts is directly fastened such as by a rivet. The metal bar slides in place through a slot defined by parts of the insulating housing of one housing projection and into a pocket of the other housing projection. A flexible conductor is bonded to the metal bar for joining to a separate conductor to ground.

These and other aspects of the present invention will become more apparent with reference to the following description and drawings.

THE DRAWING

FIG. 2 is a side elevation view of a receptacle in accordance with an embodiment of the present invention showing contact components within the base housing with the cover and mounting yoke, as shown in FIG. 1, removed;

FIG. 3 is a view of an insulating base portion of a housing of a receptacle in accordance with the embodiment of the previous views showing the internal configuration of insulating housing walls and their relation to a circuit board that may be associated therewith;

FIG. 4 is a view like that of FIG. 3 further including the internal contact elements and surge suppressor elements of a specific embodiment of the invention; and FIG. 5 is a bottom view of a receptacle in accordance with the present invention showing the base portion and isolated ground.

PREFERRED EMBODIMENTS

Figure 1:
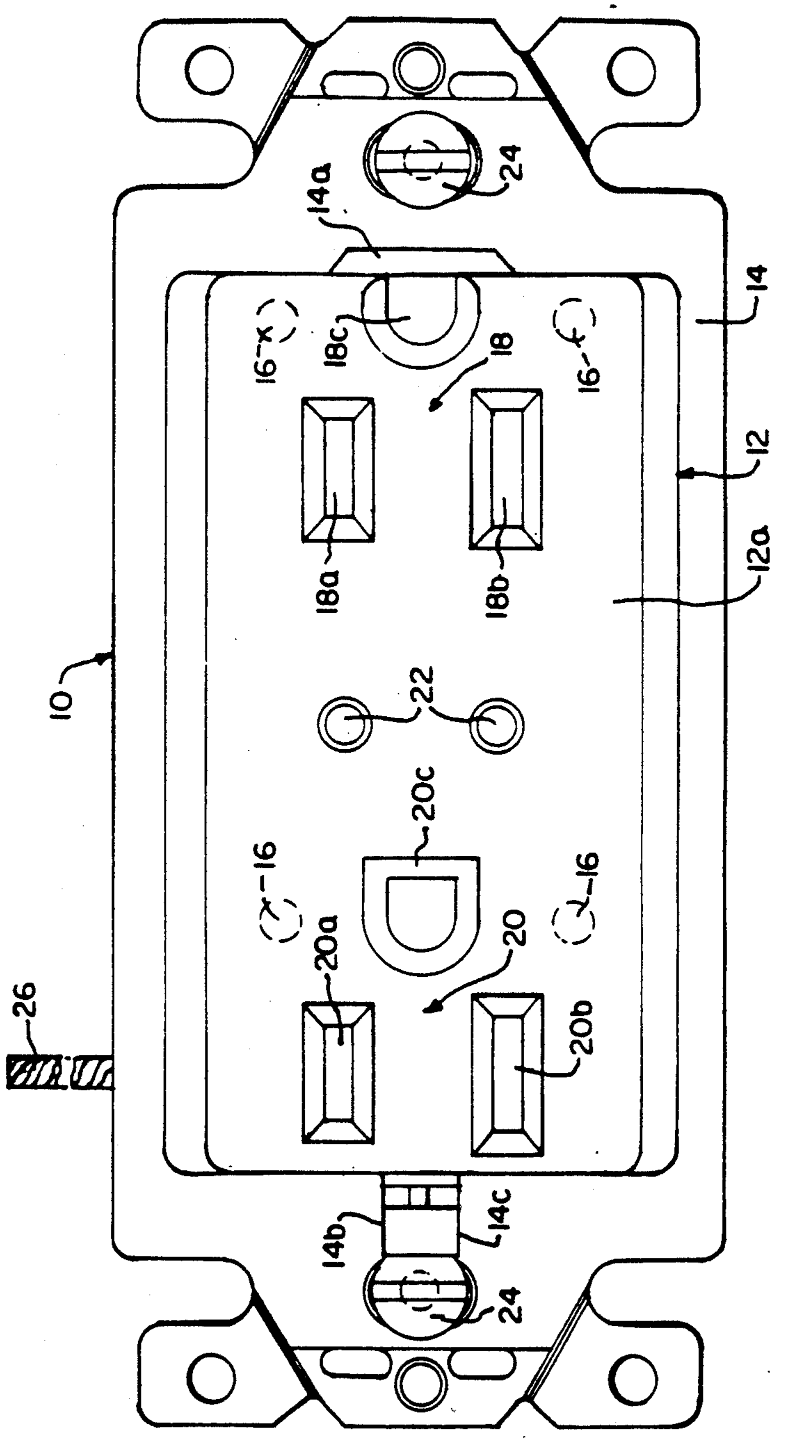
FIG. 1 is a front view of a receptacle in accordance with an embodiment of the present invention showing a cover and mounting yoke but not intended to show internal components through the openings in the front cover.

Referring to the drawings, FIG. 1 shows a front view of a duplex receptacle 10 in accordance with the present invention. The example receptacle of the drawing is similar to Bryant Type T-82 modified to incorporate surge suppression and isolated ground features. In FIG. 1, there is an insulating front cover 12*a* of device housing 12 which also includes an insulating base 12*b* as shown in FIGS. 2-5. A metal mounting yoke 14 is held in place between the front cover 12*a* and the housing base 12*b* when they are secured together by fasteners extending upward from the bottom of the base at locations 16. The cover 12*a* is provided with two areas 18 and 20 with apertures to the internal contacts. The apertures include a pair in each area (18*a* and 18*b*; 20*a* and 20*b*) to the internal power contacts plus an additional aperture in each area (18*c*; 20*c*) to the internal ground contact. For simplicity of illustration, no part of the internal contacts is shown in FIG. 1 and also certain normally used graphic indicia identifying the receptacle as equipped with surge suppression and isolated ground features have been omitted.

The front cover 12*a* is also provided with apertures 22 for viewing one or more indicator devices associated with an internal surge suppressor circuit. In the embodiment shown, two such indicators are employed.

The mounting yoke 14 is apertured at each end for conventional mounting of the receptacle in an outlet box or similar installation such as by fasteners 24. Because the intent is to illustrate a receptacle with isolated ground, the mounting yoke has a notched portion 14*a* that assures a gap from the location of the upper-most ground contact. Also, the yoke has another notched portion 14*b* fit with a metal spring clip 14*c* that forces the mounting screw 24 into contact with mounting screw 24, a feature that has been previously used in isolated ground receptacles.

FIG. 1 also illustrates a laterally extending isolated ground wire 26 associated with a conductor on the underside of the device as will be subsequently described.

FIG. 2 shows a side view of the base 12*b* of the device 10, absent the front cover and the mounting yoke, but with some of the key interior components shown. The base is a unitary, molded, insulating member configured to have internal walls defining compartments for locating internal elements. The base 12*b* without components in place is shown in plan view in FIG. 3.

In the receptacle as made, the internal depth of the base is only about 0.4 in. (dimension x in FIG. 2) and the extra space afforded by the cover is less than about 0.2 in. Therefore the need is to provide surge suppression within a space whose depth is merely about 0.6 in or less.

The contact apertures 18*a, b* and *c* and 20*a, b* and *c* of the cover 12*a* of FIG. 1 each access a contact shown in FIGS. 2 and 4 having a reference numeral higher than that of its corresponding aperture by 10. In FIG. 2 is shown one of the power contacts 28*b* and 30*b* in each set of contacts 28 and 30, the other power contact being behind that shown, and a ground contact 28*c* and 30*c* for each set. Between the sets of contacts, there is a central portion or volume 32 of the base 12*b* that in this embodiment is configured to be provided with a suppressor circuit 34 mounted in accordance with the present invention. The suppressor circuit includes an insulating circuit board 35 on the underside of which are mounted various components of the suppressor circuit interconnected in circuit relationship. These components include, for example, a fuse 36 and one or more metal oxide varistor devices 37, and additional components 38 that are not detailed herein; for further description of the circuit, see copending application Ser. No. 345,929, filed May 1, 1989 and assigned to the present assignee, the description of which is incorporated herein by reference. The suppressor circuit 34 is readily assembled as a subassembly outside of the receptacle base 12*b* and is put in location with the varistor 37 on the underside and the circuit board 35 fit in place with elements of the base housing walls so as to be secured in place. Once the subassembled surge suppressor 34 is in place, appropriate interconnections with the internal device contacts are made.

The power contacts of the two sets of contacts 28 and 30 are interconnected as shown by the interconnections 29*a* and 29*b* in the view of FIG. 4. In FIG. 2, a flexible lead 42 to one pair of power conductors (28*b* and 30*b*) is illustrated; a flexible lead 43 to the other pair of power contacts of the two sets of contacts would be located behind the one shown in the view of FIG. 2 but is shown in FIG. 5.

Referring to FIGS. 3 and 4 in conjunction with the view of FIG. 2, a more complete understanding of the mounting of the surge suppressor circuit 34 may be obtained. FIG. 3 shows the housing base 12*b* without the components and other contacts all illustrated. For orientation with the other drawings there are shown in FIG. 3, the locations of the apertures 42*a* and 43*a* for entrance of the conductive leads 42 and 43 to the power contacts as well as the openings 16 for the fasteners that join the housing cover 12*a* and base 12*b* together. Compartments 45, 46, 47 and 48 illustrated in FIG. 3 accommodate the power contacts 28*a*, 28*b*, 30*a*, and 30*b*, respectively, as illustrated in FIG. 4 and the ground contacts 28*c* and 30*c* are located in respective compartments 49 and 50. FIG. 3 also shows in outline form the location of the circuit board 35 as illustrated in FIG. 2 and more fully shown in FIG. 4. Circuit board 34 may be interlocked with base housing wall portions in various ways. In this example, the circuit board 35 has a pair 35*a* and 35*b* of lateral ears that fit within notches 53 of a portion of an insulating wall 54 on or in the top portion of the view of FIG. 4. In the lower portion of the view of FIG. 3, the board is shown resting on top of a portion of an insulating wall 55.

Referring now to FIG. 4, the elements as shown in FIG. 3 are shown with the sets of internal contacts 28 and 30 and surge suppressor circuit 34 in place.

The fuse 36 as shown in FIG. 2 aids in mounting the circuit 34 as it limits movement of the board 35 to the left in the view shown in FIG. 2 by its close location next to base wall 55.

In FIG. 4, it is shown how the suppressor circuit 34 is interconnected with the power contacts and their respective power leads 42 and 43 by conductors 57 and 58. Circuit 34 is also connected to ground contact 30*c* by conductor 59 which passes through a gap 55*a* in the wall 55 on which the circuit board 35 rests.

Circuit board 35 is shown as a printed circuit board as is preferred.

The ears 35*a* and 35*b* of the board 35 fit in the notches 53 of wall 54; a glue may be used if desired but is not considered necessary. The opposite edge of the board rests on wall 55 and horizontal movement is restricted by the location of fuse 36 near the wall and also by the indicators extending through apertures 22 in the cover. The cover 12 does not directly clamp down on the board 35 when secured to the base in the illustrative embodiment. Alternate designs may employ other internal housing features to secure a surge suppressor circuit board in place.

It is therefore seen that duplex receptacles of the shallow configuration necessary to fit within construction boxes having a total box depth of only about 1½ inches can be configured to include surge suppressor circuits.

FIGS. 2 and 5 also show portions 60 and 62 of the housing base 12*b* that project below the major portion of the base and accommodate the internal ground contacts 30*c* and 28*c* that have a greater length (e.g., about 0.8 in overall) than the base otherwise accommodates. A ground strap 64 connects the two ground contacts and is joined by rivets 61 and 63 to them. Flexible conductor 26 is joined to the metal ground strap 64 by soldering, for example.

As seen in the bottom view of FIG. 5, the bottom of the base 12*b* has fastener apertures for locating fasteners 17 to hold the base and cover together. Additionally, there are shown in FIG. 3 the power leads 42 and 43 to the internal conductors. The insulating base 12*b* has integrally molded with it the projections 60 and 62 for accommodating the ground contacts. These projections have broken away portions to leave openings to allow the ground strap to be inserted by sliding from the left as FIG. 5 is oriented through a slot within the insulating material of projection 60 and into a pocket of the projection 62 of the other contact. Once the strap is in place, the internal ground contacts are riveted to it.

It will be apparent that the invention may be modified from the specifics of the embodiment illustrated consistent with the more general aspects of the present invention.

I claim:

1. An electrical receptacle characterized by a housing configuration including an insulating base enclosing electrical contacts and an insulating front cover therefore and further comprising:

a surge suppressor circuit, and an insulating circuit board on which a plurality of components of said circuit are mounted, said components including an indicator device located on a first side of said circuit board facing the receptacle cover, at least one varistor connected between a pair of said electrical contacts of the receptacle, and a fuse, said varistor and said fuse being located on a second side of said circuit board facing away from the receptacle cover; and said board having portions that fit in close relation to insulating walls of the receptacle base to support and resist lateral movement of said board, said board being secured between an upper end of said wall portions and said cover when the base and front cover are assembled.

2. A receptacle in accordance with claim 1 wherein:

said insulating circuit board is positioned parallel to a bottom portion of said receptacle and has board portions including first and second lateral ears that fit on respective notched insulating wall portions to avoid lateral movement in a direction in which said ears are spaced and support said board at said notched insulating wall portions, said board further being supported by an upper face of a second insulating wall portion against movement of said board perpendicular to said board;

said ears of said board being secured between said wall portions and said cover.

3. A receptacle in accordance with claim 1 wherein:

the receptacle is a duplex receptacle and said circuit board is located intermediate two sets of electrical contacts of the receptacle;

said insulating circuit board has board portions including first and second lateral ears that fit on respective notched insulating wall portions to avoid movement in a direction in which said ears are spaced and wherein said board is supported by said notched insulating wall portions and by another insulating wall portion against movement perpendicular to said board; and said indicator device is a light emitting diode that fits with an aperture of the receptacle front cover.

4. An electrical duplex receptacle characterized by a housing configuration including an insulating base having a bottom portion and enclosing two sets of electrical contacts fixed to said bottom portion, and an insulating front cover therefore and further comprising:

a metal mounting yoke for securing the receptacle in use;

the two sets of contacts each including a pair of power contacts and a ground contact, said ground contact fixed to said bottom portion and having a length that extends beyond said bottom portion into a bottom projection extending from the base, said bottom projection having an opening allowing access to each said ground contact, and a ground conductor extending through said opening and connecting each said ground contact together; said metal mounting yoke having no electrical interconnection to said ground contacts.

5. A receptacle in accordance with claim 4 wherein:

said ground conductor comprises a metal bar positioned adjacent an outer surface and parallel to said bottom portion, said bar being connected to each of said ground contacts.

6. A receptacle in accordance with claim 5 wherein:

said metal bar fits securely within said opening of each of said bottom projections and connected to a portion of said ground contact extending into said bottom projection and a flexible conductor is bonded to said metal bar for joining to a separate conductor to ground.

7. A receptacle in accordance with claim 4 and further comprising:

a surge suppressor circuit, and an insulating circuit board on which a plurality of components of said circuit are mounted, said board being disposed parallel to a bottom portion of said receptacle; and said board having portions that fit in close relation to insulating walls of the receptacle base so said board is secured between an upper end of said insulating wall and said cover when said base and front cover are assembled.

8. A receptacle in accordance with claim 7 wherein: said ground conductor comprises a metal bar to which each of said ground contacts is fastened; and said insulating circuit board has board portions including first and second lateral ears that fit on respective notched insulating wall portions to avoid lateral movement in the direction in which said ears are spaced and wherein said board is supported by said notched insulating wall portions and by a second insulating wall portion against movement perpendicular to said board, said board being secured between said wall portions and said cover.

9. A receptacle in accordance with claim 8 further comprising:

said metal bar fits securely within said opening of each of said bottom projections and a flexible conductor is bonded to said metal bar for joining to a separate conductor to ground;

said components include at least a varistor connected between a pair of the electrical contacts of the receptacle, a fuse, and an indicator device; and said indicator device is located on a first side of said circuit board facing the receptacle cover, said at least one varistor and said fuse is located on a second side of said circuit board facing away from the receptacle cover.

10. An electrical receptacle characterized by a housing configuration including an insulating base enclosing electrical contacts, at least one upstanding wall extending from said insulating base, said wall having a pair of opposing notches in opposite edges of said wall and an insulating front cover therefor and further comprising:

a surge suppressor circuit comprising a plurality of components mounted on an insulating circuit board;

said insulating circuit board having first and second spaced apart lateral ears extending from opposite corners of a first end of said board cooperating with said notches of said upstanding wall to support one end of said board and to avoid lateral movement in the direction in which said ears are spaced;

said board being secured between said notches and said cover.

11. The electrical receptacle of claim 10 and further comprising a second upstanding insulating wall extending from said base, said second wall having an upper face supporting a second end of said board.

12. The electrical receptacle of claim 11 wherein said surge suppressor circuit includes components including at least one varistor connected between a pair of electrical contacts of the receptacle, a fuse and an indicator device, and at least one component is positioned in relation to said second end of said board and closely spaced to said second insulating wall, thereby limiting movement of said board toward said second wall.

13. The electrical receptacle of claim 12 wherein said indicator device is positioned on a first side of said board and extends through an aperture in said cover, thereby limiting lateral movement of said board.

14. An electrical duplex receptacle characterized by a housing configuration including an insulating base having a bottom portion and wall portions enclosing two sets of electrical contacts, and an insulating front cover therefor, said receptacle further comprising:

metal mounting yoke for securing the receptacle in use;

two sets of contacts each including a pair of power contacts mounted on said bottom portion and a ground contact, said ground contact mounted on said bottom portion and having a length extending beyond said bottom portion to a bottom projection extending from said bottom portion, said bottom projection having an opening allowing access to said ground contact, and a ground conductor adjacent an outer face of said bottom portion and extending into said opening connecting each said ground contact of said sets together, said metal mounting yoke having no electrical interconnection to said ground contacts; and an insulating circuit board positioned substantially parallel to said bottom portion and having a surge suppressor circuit mounted thereon, said surge suppressor circuit comprising an indicator device located on a first side of said circuit board facing the receptacle cover, at least one varistor and a fuse located on a second side of said circuit board facing away from the receptacle cover;

said circuit board having board portions fitting in close relation to and support by an upper face of an insulating wall to secure said circuit board to said wall.

15. The electrical receptacle of claim 2, wherein said fuse is positioned on said board and closely spaced to said second insulating wall, thereby limiting movement of said board toward said second wall.

16. The electrical receptacle of claim 9, wherein said fuse is positioned on said board and closely spaced to said second insulating wall, thereby limiting movement of said board toward said second wall.

* * * * *